March 15, 1938. A. B. RYPINSKI 2,111,250
PULL-OUT SWITCH BOX
Filed Feb. 20, 1936 2 Sheets-Sheet 1
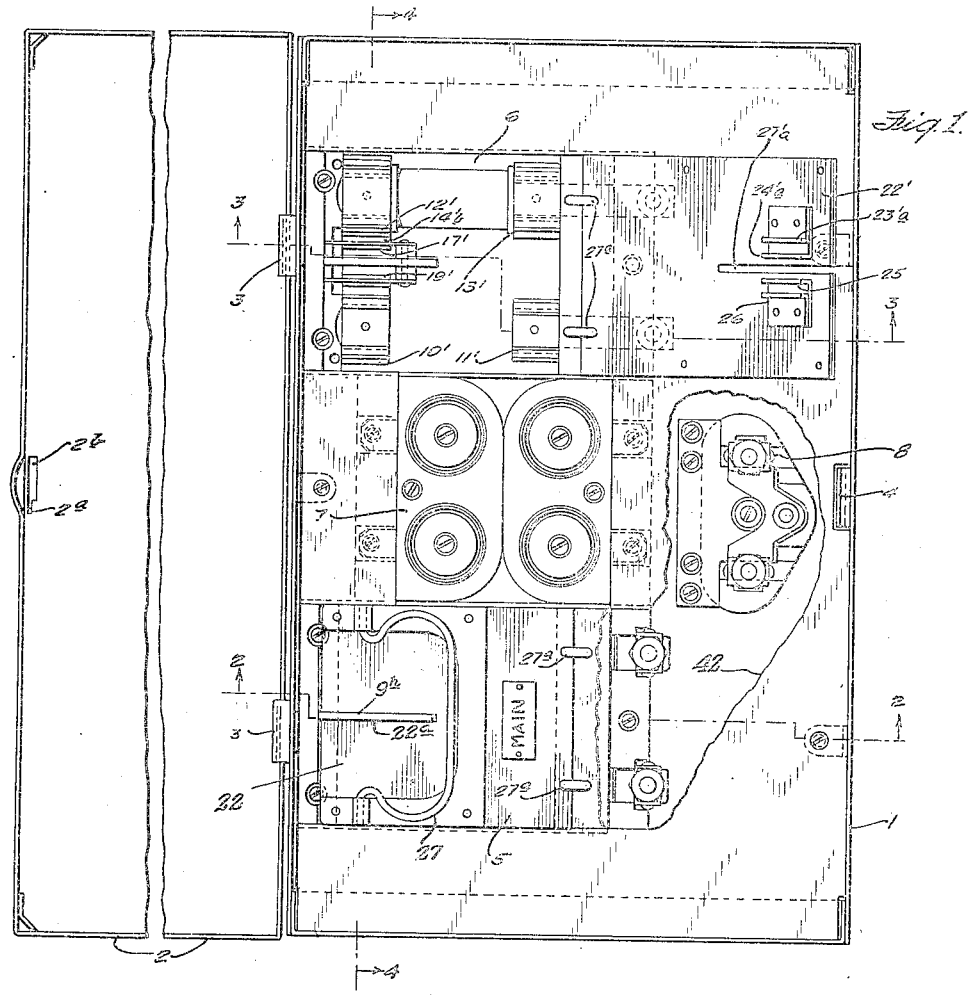
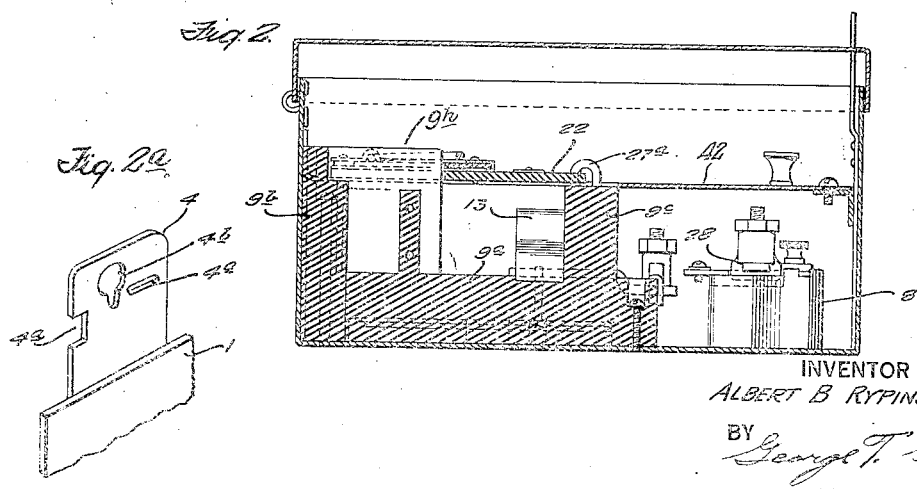
INVENTOR
ALBERT B RYPINSKI
BY George T. Gill
ATTORNEY

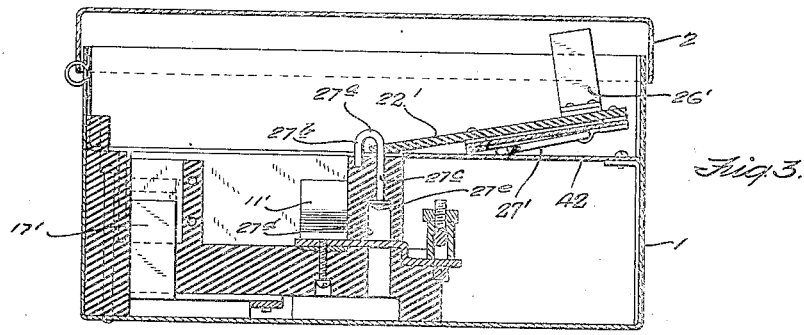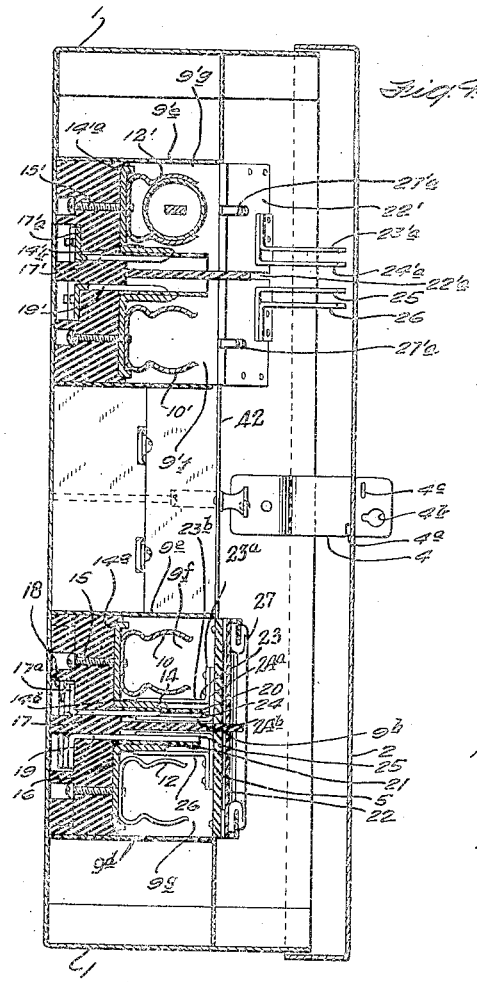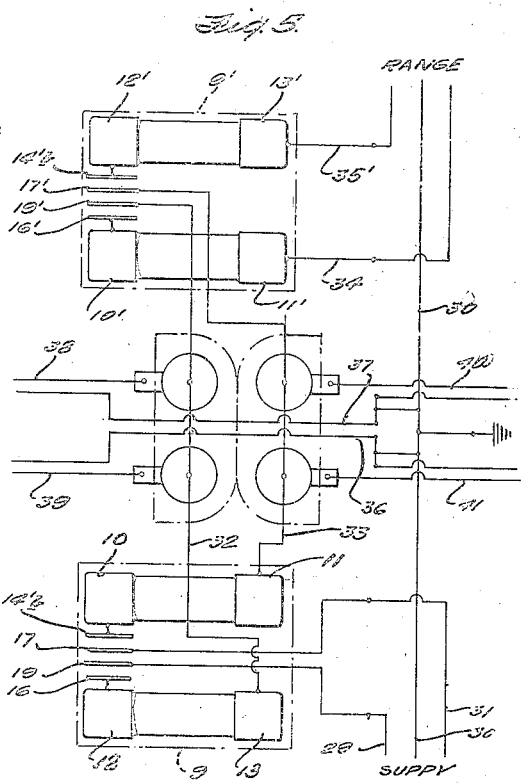

Patented Mar. 15, 1938

2,111,250

UNITED STATES PATENT OFFICE 2,111,250

PULL-OUT SWITCH BOX

Albert B. Rypinski, Laurelton, N. Y., assignor to Metropolitan Device Corporation, a corporation of New York Application February 20, 1936, Serial No. 64,827

7 Claims. (Cl. 200—114)

The invention herein disclosed relates to a pull-out switch and switch box arrangement that is particularly suitable for an inlet switch and switch box through which the supply lines are connected to the circuits in a building.

An object of the invention is to provide an arrangement of this type such that when a switch is open all exposed electrical conductors are disconnected from the supply, another object of the invention to provide an arrangement of this type in which the cover of the box may be closed while a switch is in an open position, and a further object of the invention is to provide a compact arrangement of switches and fuse blocks within the switch box for connecting various branch circuits to the supply.

In accordance with the invention, there is provided a switch that includes a base serving the dual capacity of a fuse block and switch base. The base is shaped like a box and has secured thereon two pair of fuse clips for barrel type fuses, the fuse clips being arranged so that fuses therein lie parallel to each other. To one fuse clip of each pair of clips there is electrically connected a switch element that is secured to the base. Another switch element is mounted on the base for each pair of fuses, these latter switch elements being electrically insulated and embedded in insulating material so as to be inaccessible when the switch is open. The line wires are connected to these embedded switch elements. A cover, of stiff insulating material, is pivotally secured to the base for movement through an angle of substantially one hundred and eighty degrees. On the cover there are two pair of switch blades, the blades of each pair being connected together. In the closed position of the cover these blades electrically connect an embedded switch element to a switch element connected to the fuse clip.

One arrangement of such switches and fuse blocks that is particularly suitable for a dwelling is illustrated in the accompanying drawings in which:

Fig. 1 is a plan of a switch box constructed in accordance with this invention having a part of an intermediate partition broken away;

Fig. 2 is a transverse section taken along the irregular line 2—2 of Fig. 1;

Fig. 2a is an isometric showing a detail of the box;

Fig. 3 is a transverse section taken along the line 3—3 of Fig. 1;

Fig. 4 is a longitudinal section taken along the line 4—4 of Fig. 1; and

Fig. 5 is a wiring diagram of the interconnection of the elements in the box.

The box 1 is an oblong sheet metal box having appropriately placed knock-outs for cables or conduits. A cover 2 is hinged to the box by hinges 3 and it is provided with an opening to receive a latch 4 extending from a side of the box 1. The opening is oblong in shape and has a portion 2a of greater length than the rest 2b as clearly seen in Figure 1. The latch 4 is a piece of resilient material secured to the side of the box and positioned to be received in the opening 2a in the cover. It is offset from the side to which it is attached and its width is greater than the portion 2b of the opening of less length. A notch 4a cut in the edge of the latch 4 reduces the width of the strip at this point to be received in the portion 2b of the opening in the cover. When the cover is closed, the latch is sprung to be received in the portion 2a of the opening and when the cover is fully closed, the latch, due to its resiliency, moves into the position in which the edge of the section 2b of the opening is received in the notch 4a. The latch is provided with openings 4b and 4c to receive a lock and seal.

Within the box 1 there are mounted two switches 5 and 6 adjacent opposite ends of the box, the switch 5 being the main switch and the switch 6 being a switch for a circuit such as a circuit to an electric range. Between the switches 5 and 6, there is mounted a fuse block 7 for branch lighting circuits and at one side of the fuse block a connector block 8.

The switches 5 and 6 are identical in construction and therefore only the switch 5 will be described in detail the same numerals primed being applied to similar parts of the switch 6. This switch includes a base 9 made of electrical insulating material which is secured to the rear wall of the box 1 as by machine screws. The base 9 is of box-like shape having a bottom 9a, end walls 9b and 9c, and side walls 9d and 9e, and forms a combined switch base and fuse block. The box-like compartment formed in the base 9 is divided into two compartments 9f and 9g by a central longitudinal partition 9h which extends above the side walls for a certain portion of its length. In the compartment 9f is a pair of spaced fuse clips 10 and 11 and a similar pair of fuse clips 12 and 13 in the compartment 9g. Each pair of fuse clips is adapted to receive a barrel type fuse.

Cooperating with the fuse clip 10 there is a switch element 14 which consists of a strip of copper bent to form a right angle. One of the sections 14a of the strip of metal lies along the base transversely thereof and directly beneath the fuse clip, both being secured to the base by the same machine screw 15. The other section 14b of the strip 14 extends at right angles to the base, spaced slightly from the fuse clip. A similar copper strip 16 cooperates with the fuse clip 12. Extending through the base, there is a copper strip 17 forming another switch element that extends perpendicular to the base and parallel and adjacent to the switch element 14b. The switch element 17 has a right angular portion 17a that is secured in a recess in the base 9 and to a conductor 18 adapted to be connected to the supply line. A similar switch element 19 is associated with the switch element 16. These several switch elements terminate an appreciable distance below the edges of the sides of the base, and the switch elements 17 and 19 are surrounded with insulating material 20 and 21 and are only accessible through a narrow slot at the top of this insulating material.

Pivotally secured to the base, there is a cover 22 which in the closed position covers the fuse clips and the fuses therein. The cover has a longitudinal slot 22a therein which in the closed position of the cover receives the extended portion of the partition 9h. On each side of this slot, there is secured to the cover a pair of switch blades for cooperation with the switch elements in the base. The switch blades 23 and 24 are right angular strips of conductive metal and each has an arm 23a and 24a secured together and to the cover and an arm 23b and 24b extending perpendicular to the plane of the cover. The arms 23b and 24b are spaced apart and positioned so that in the closed position of the cover the blade 23b contacts with the switch element 14b and the blade 24b contacts with the switch element 17 as illustrated in Figure 4. The switch element 17 is thus connected to the fuse clip 10 when the cover 22 is closed. A similar pair of switch blades 25 and 26 mounted on the cover on the other side of the slot 22a cooperate with the switch blades 19 and 16 to connect the fuse clip 12 to the line switch element 19. A handle 27 is pivotally secured to the cover 22 to facilitate the opening and closing of the cover.

The cover 22 is pivotally secured to the base by spaced, inverted U-shaped hinges 27a. These hinges consist of a piece of round stock bent in the form of a U and having one leg 27b shorter than the other leg 27c. The leg 27b is embedded in the base and the leg 27c extends through a bore in the base to a counterbore 27d. The end of the leg 27c is riveted over as indicated at 27e.

The fuse block 7 intermediate the switches 5 and 6 is of the ordinary type for receiving plug fuses. The fuse block carries two pair of fuse receptacles as illustrated. The connector block 8 facilitates the connection of the wires and consists of a block of insulating material secured to the rear wall of the switch box and carrying several connectors 28 interconnected and connected to the line and branch circuits as illustrated in the wiring diagram constituting Figure 5.

In the wiring diagram the switch box is disclosed in conjunction with a three wire single phase system. The supply lines 29, 30 and 31 are shown as being connected respectively to the switch element 19 in the fuse block and switch base 9, the connectors 28, and the switch element 17 in the fuse block and switch base 9. The fuse clips 11 and 13 are each connected by conductors 33 and 32 to the central element of a pair of the fuse receptacles in the fuse block 7, the fuses being connected in parallel, and the fuse clip 11 is connected to the switch element 17' in the switch base and fuse block 9' and the fuse clip 13 is connected to the switch element 19' in the base 9'. The clips 11' and 13' are connected to a circuit 34 and 35 for an electric range, the supply 30 also going to the range. At the connector block 8, the line 30 is connected to the ground and to wires 36 and 37 which form with wires 38, 39, 40 and 41, connected to the plug fuse receptacles, four lighting circuits as indicated.

It will be noted that when the cover 22 of the switch 5 is closed, the system is connected through to the switch elements 17' and 19' and if the cover 22' is closed, it is connected through to the range. If, however, the switch cover 22' of the switch 6 is opened, all exposed conductors and the fuses in the switch 6 are disconnected from the line; they are dead. Likewise when the switch 5 is open all exposed conductors are dead.

A panel 42 forms an intermediate partition in the switch box and covers the connector block 8. It will be noted that in the open position of the switches 5 and 6, the covers lie against this panel and the cover 2 of the switch box may be closed to prevent tampering with the switches or to prevent the switches from being closed while one is working on the circuits.

It is obvious that various changes may be made by those skilled in the art in the details of the embodiment of the invention illustrated in the drawings and described in detail above within the principle and scope of the invention as expressed in the appended claims.

I claim:

1. In a switch, a base of insulating material including a slot open at the upper end, a switch element within the slot and having its upper edge below the upper edge of the slot, another switch element spaced laterally of and separated from said first mentioned switch element by insulating material, a switch pivotally secured to the base including a pair of blades electrically connected together and positioned to engage the switch elements in the base in the closed position of the switch.

2. In a switch box, a fuse block and switch base of insulating material secured to the rear wall of the box, a pair of spaced switch elements mounted on the base and spaced laterally of each other, each switch element being surrounded with insulating material and adapted to be connected to the line, fuse clips adjacent each of said switch elements, a switch element mounted on the base and electrically connected to each of said fuse clips, a switch pivotally mounted on the base for movement through an angle of approximately one hundred and eighty degrees, two pair of switch blades on the switch, each pair of blades including two electrically connected blades spaced laterally of each other and positioned to contact with an embedded switch element and a switch element connected to a fuse clip in the closed position of the switch.

3. In a switch box of the type described, a sheet metal box, a cover therefor, a box-shaped fuse block and switch base secured to the rear wall thereof, two pair of fuse clips mounted in the fuse block, each pair including two spaced electrically insulated clips adapted to receive a barrel type fuse and the several clips being arranged so the fuses therein lie parallel to each other in a row, a switch element for each pair of clips electrically connected to one clip of the pair and spaced laterally of the fuse clip, another switch element for each pair of fuse clips positioned adjacent the other switch element and spaced laterally therefrom, said latter switch elements being embedded in insulating material and inaccessible when the switch is open, a cover of insulating material for the fuse block pivotally connected thereto for movement through an angle of approximately one hundred and eighty degrees, two pair of switch blades carried by said cover, each pair including two electrically connected blades positioned to engage an embedded switch element in the block and a switch element connected to a fuse clip in the closed position of the cover.

4. In a switch box of the type described, a sheet metal box, a cover therefor, a fuse block and switch secured to the rear wall thereof adjacent each end of the box, each fuse block and switch including a box-shaped base, two pair of fuse clips mounted in the base, each pair including two aligned, spaced electrically insulated clips adapted to receive a barrel type fuse and the several clips being arranged so that fuses received therein lie parallel to each other in a row, a switch element for each pair of clips electrically connected to a corresponding clip of the pair and spaced laterally of the clip, another switch element for each pair of fuse clips positioned adjacent the other switch element and spaced laterally therefrom, said latter switch elements being adapted to be connected to the line and being embedded in insulating material and inaccessible when the switch is open, a cover of insulating material pivotally connected to the fuse block for movement through an angle of approximately one hundred and eighty degrees, two pair of switch blades carried by said cover, each pair including two electrically connected blades positioned to engage an embedded switch element in the block and a switch element connected to a fuse clip in the closed position of the cover, and conductors connecting the fuse clips opposite to those associated with the switch blades of one of said fuse blocks to the embedded switch elements of the other fuse block.

5. In a switch of the type described, a base of insulating material shaped in the form of a box, two pair of fuse clips mounted in the base, each pair including two spaced, electrically insulated clips adapted to receive a barrel type fuse and the several clips being arranged so the fuses therein lie in a row and parallel to each other, a switch element for each pair of clips electrically connected to the corresponding clip of each pair and spaced laterally thereof and between the fuse clips, another switch element for each pair of fuse clips, said latter switch elements being mounted in the base between the switch elements connected to the fuse clip and being electrically disconnected and surrounded with insulating material, a partition of insulating material within the base extending parallel to the axes of the fuse clips and separating the fuse clips and said last mentioned switch elements, the partition having a portion adjacent the switch elements extending above the level of the base, a cover pivotally secured to the base at one end, the cover having a slot therein to receive the extended portion of said partition, two pair of switch blades carried by said cover, one pair on each side of the slot in the cover and each pair of blades including two laterally spaced, electrically connected blades extending perpendicularly to the cover and positioned to engage one of the switch elements surrounded by insulating material and a switch element connected to a fuse clip.

6. In a box of the type described, the combination comprising a sheet metal box, a cover therefor, a partition within the box intermediate the cover and the rear wall of the box and parallel thereto, the partition having an opening therethrough, a switch base within the box and secured to the rear wall thereof below the opening in the partition, switch elements mounted on said switch base, the switch elements being surrounded by insulating material to render them inaccessible, a switch pivotally secured at one end to the switch base for movement through an angle of approximately 180 degrees, and blades carried by said switch element and extending perpendicular to the switch and positioned to contact with the switch elements in the base, the position of the pivotal connection between the switch and the switch base being within the box and spaced from the edge thereof a distance to accommodate the switch blades in the open position of the switch and the closed position of the cover of the box.

7. In a box of the type described, the combination comprising a sheet metal box, a cover therefor, a partition within the box intermediate the cover and the rear wall of the box and parallel thereto, the partition having an opening therethrough, a switch base within the box secured to the rear wall thereof below the opening in the partition, switch elements mounted on said switch base, the switch elements being surrounded by insulating material to render them inaccessible, fuse clips secured in the base and accessible through the opening in the partition, a cover for the switch base pivotally secured at one end to the switch base for movement through an angle of approximately 180 degrees, switch blades carried by said switch base cover extending perpendicular to the cover and positioned to contact with the switch elements in the base, the position of the partition and pivotal connection between the switch base cover being spaced from the edge of the box a distance sufficient to accommodate the switch blades in the open position of the switch base cover and the closed position of the cover of the box.

ALBERT B. RYPINSKI.